United States Patent

Hou et al.

(10) Patent No.: US 12,441,622 B2
(45) Date of Patent: Oct. 14, 2025

(54) MODIFIED TITANIUM DIOXIDE NANOMATERIAL AND PREPARATION METHOD AND APPLICATION THEREOF

(71) Applicant: CHINA UNIVERSITY OF PETROLEUM—BEIJING, Beijing (CN)

(72) Inventors: Jirui Hou, Beijing (CN); Zhuo Lu, Beijing (CN)

(73) Assignee: CHINA UNIVERSITY OF PETROLEUM—BEIJING, Beijing (CN)

( * ) Notice: Subject to any disclaimer, the term of this patent is extended or adjusted under 35 U.S.C. 154(b) by 0 days.

(21) Appl. No.: 18/679,115

(22) Filed: May 30, 2024

(65) Prior Publication Data

US 2025/0250180 A1 Aug. 7, 2025

(30) Foreign Application Priority Data

Feb. 4, 2024 (CN) .......................... 202410160586.1

(51) Int. Cl.
*C01G 23/047* (2006.01)
*C09K 8/58* (2006.01)

(52) U.S. Cl.
CPC .............. *C01G 23/047* (2013.01); *C09K 8/58* (2013.01); *C01P 2002/01* (2013.01); *C01P 2002/72* (2013.01); *C01P 2002/82* (2013.01); *C01P 2004/03* (2013.01); *C01P 2004/04* (2013.01); *C01P 2004/64* (2013.01); *C01P 2006/12* (2013.01); *C09K 2208/10* (2013.01)

(58) Field of Classification Search
CPC ............................... C01G 23/047; C09K 8/58
See application file for complete search history.

(56) References Cited

FOREIGN PATENT DOCUMENTS

| CN | 108821335 A | * 11/2018 | ............. B82Y 30/00 |
| CN | 118389135 A | * 7/2024 | ............. B82Y 30/00 |

* cited by examiner

*Primary Examiner* — Crystal J Lee
(74) *Attorney, Agent, or Firm* — Davis Wright Tremaine LLP

(57) ABSTRACT

Provided is a modified titanium dioxide nanomaterial and its preparation method and application, the method including the following steps: 1) mixing 1 part by weight of an anatase type titanium dioxide nanosheet with a solution containing 1 to 5 parts by weight of a coupling agent for reaction to obtain an intermediate; 2) adding 1 to 15 parts by weight of a fatty acid compound and 0.01 to 1 parts by weight of a catalyst into the intermediate for modification reaction, and then washing and drying the intermediate to obtain a modified titanium dioxide nanomaterial; where the coupling agent includes at least one of titanate coupling agent and silane coupling agent, and contains one terminal amino group; the fatty acid compound is a linear mono-saturated fatty acid with a carbon atom number of 8 to 26.

12 Claims, 4 Drawing Sheets

MODIFIED TITANIUM DIOXIDE NANOMATERIAL AND PREPARATION METHOD AND APPLICATION THEREOF

CROSS-REFERENCE TO RELATED APPLICATION

The present application claims priority to Chinese Patent Application No. 202410160586.1, filed on Feb. 4, 2024, which is hereby incorporated by reference in its entirety.

TECHNICAL FIELD

The present disclosure relates to a modified titanium dioxide nanomaterial and a preparation method and an application thereof, belonging to the technical field of petroleum extraction.

BACKGROUND

With the further development of social economy, the demand for petroleum resources in various industries continues to increase; and with the exploitation of petroleum resources, the proportion of low-permeability oil fields in China is increasing. Exploring the exploitation of low-permeability oil fields and enhancing the oil recovery of low-permeability oil fields can further tap into the economic potential of low-permeability oil fields and promote the development of the petroleum industry.

At present, chemical substances are commonly used to enhance the oil recovery of low-permeability oil fields. Specifically, crude oil may be driven out by injecting chemical substances (such as polymer, gas, and surfactant) into the ground. However, traditional surfactant has large adsorption capacity, severe loss, and high cost in geological formation; polymer is prone to clogging the pore throat of rock, causing severe shear degradation in the reservoir and irreversible damage to the reservoir; gas is prone to gas channeling and has a low sweep coefficient, which seriously limits the application of traditional oil and gas field development materials.

Researchers are exploring the use of nanomaterial for the exploitation of low-permeability oil fields. The commonly used nanomaterial is mostly spherical such as $TiO_2$, $SiO_2$, $Al_2O_3$, etc. However, these nanomaterials have the problem of low oil recovery.

SUMMARY

The present disclosure provides a preparation method of modified titanium dioxide nanomaterial, and the nanofluid prepared from the modified titanium dioxide nanomaterial obtained by the preparation method can significantly enhance the oil recovery.

The present disclosure provides a modified titanium dioxide nanomaterial, which is prepared according to the above method. When a coupling agent is grafted on the surface of the titanium dioxide nanosheet and a fatty acid compound is used for modification on this basis, the modified titanium dioxide nanomaterial is obtained, which can effectively reduce the interfacial tension between oil and water and have high dispersion stability, enhancing the oil recovery.

The present disclosure provides a nanofluid, which includes the modified titanium dioxide nanomaterial mentioned above, thereby effectively enhancing oil recovery and improving oil recovery work efficiency.

The present disclosure provides a method for oil recovery, by injecting a nanofluid containing the modified titanium dioxide nanomaterial into a reservoir, the goal of enhancing the oil recovery is achieved.

One aspect of the present disclosure provides a preparation method of modified titanium dioxide nanomaterial, including the following steps:
1) mixing 1 part by weight of an anatase type titanium dioxide nanosheet with a solution containing 1 to 5 parts by weight of a coupling agent for reaction to obtain an intermediate;
2) adding 1 to 15 parts by weight of fatty acid compound and 0.01 to 1 parts by weight of catalyst into the intermediate for modification reaction to give a reaction product, and then washing and drying the reaction product to obtain a modified titanium dioxide nanomaterial;
where, the coupling agent includes at least one of a titanate coupling agent and a silane coupling agent, and the coupling agent contains one terminal amino group; the fatty acid compound is a linear mono-saturated fatty acid with a carbon atom number of 8 to 26.

In the preparation method as described above, the carbon atom number is 12 to 22.

In the preparation method as described above, the modified titanium dioxide nanomaterial has a specific surface area of 40 to 100 $m^2/g$, a thickness of 2 to 6 nm and a side length of 10 to 40 nm.

In the preparation method as described above, a preparation process of the anatase type titanium dioxide nanosheet includes the following steps:
adding 1 part by weight of titanium source into a solution containing 0.1 to 1 parts by weight of hydrofluoric acid, stirring and mixing with a reaction temperature controlled at 150 to 250° C. and a reaction time of 2 to 24 h, cooling to room temperature (20 to 25° C.), washing and drying to obtain the anatase type titanium dioxide nanosheet.

For the preparation method as described above, in the preparation process of the anatase type titanium dioxide nanosheet, the part by weight of hydrofluoric acid is 0.1 to 0.5, the reaction temperature is 180 to 230° C., and the reaction time is 12 to 24 h.

Another aspect of the present disclosure provides a modified titanium dioxide nanomaterial, which is prepared by the preparation method as described above.

Another aspect of the present disclosure provides a nanofluid, which includes the modified titanium dioxide nanomaterial as described above and a solvent, and the solvent includes one of aqueous salt solution and deionized water.

For the nanofluid as described above, a concentration of the modified titanium dioxide nanomaterial is 30 to 1000 ppm.

For the nanofluid as described above, a concentration of the aqueous salt solution ranges from 100 to 300000 mg/L.

Another aspect of the present disclosure provides a method for oil recovery, in which the nanofluid as described above is used for oil reservoir recovery.

The preparation method provided by the present disclosure involves reaction between an anatase type titanium dioxide nanosheet and a coupling agent with a terminal amino group to obtain an intermediate. The modified titanium dioxide nanomaterial is obtained by modifying the intermediate with fatty acid compound with a certain number of carbon atoms under the action of a catalyst. Where, the anatase type titanium dioxide undergoes a dehydration condensation reaction with the coupling agent, relying on covalent bonds to connect together to form an intermediate with a terminal amino group. Subsequently, the fatty acid compound reacts with the intermediate to form the modified titanium dioxide nanomaterial. The anatase type titanium dioxide has hydrophilicity, and a long carbon chain grafted on its surface by the connection of the coupling agent has hydrophobicity. When the modified titanium dioxide nanomaterial is applied into the nanofluid, under the synergistic effect of the titanium dioxide nanosheet and the long carbon chain, the oil/water interfacial tension is reduced, thereby enhancing the oil recovery. Moreover, the modified titanium dioxide nanomaterial is in the form of flakes, so the nanofluid has high oil recovery and stability in reservoirs.

The modified titanium dioxide nanomaterial provided by the present disclosure is prepared and obtained according to the above method, therefore, the nanofluid including the modified titanium dioxide nanomaterial can significantly enhance the oil recovery.

The nanofluid provided by the present disclosure includes the modified titanium dioxide nanomaterial mentioned above, therefore the nanofluid has a lower oil/water interfacial tension, which is beneficial for enhancing oil recovery.

The oil recovery method provided by the present disclosure adopts the above-mentioned nanofluid, so that the problem of low oil recovery in low-permeability oil fields at present can be solved to a large extent.

DESCRIPTION OF EMBODIMENTS

Figure 1:
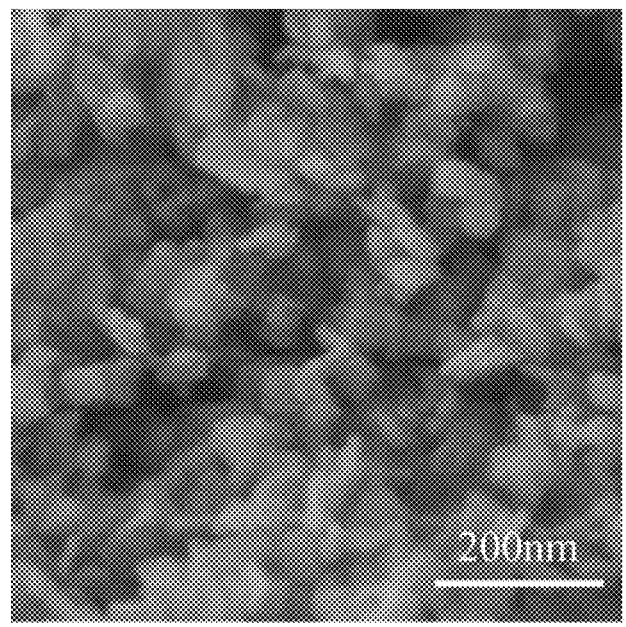
FIG. 1 is an SEM (scanning electron microscope) image of an anatase type titanium dioxide nanosheet prepared in Example 1 of the present disclosure.

In order to make the purpose, technical solution, and advantage of the embodiments of the present disclosure clearer, the following will provide a clear and complete description of the technical solution in the embodiments of the present disclosure with reference to the embodiments of the present disclosure. It is evident that the described embodiments are a part of the embodiments of the present disclosure, not all of them. Based on the embodiments in the present disclosure, all the other embodiments obtained by the person skilled in the art without creative labor shall fall within the scope of protection of the present disclosure.

One aspect of the present disclosure provides a preparation method of a modified titanium dioxide nanomaterial, including the following steps:

1) mixing 1 part by weight of an anatase type titanium dioxide nanosheet and a solution containing 1 to 5 parts by weight of a coupling agent for reaction to obtain an intermediate;

2) adding 1 to 15 parts by weight of a fatty acid compound and 0.01 to 1 parts by weight of a catalyst into the intermediate for modification reaction to give a reaction product, and then washing and drying the reaction product to obtain a modified titanium dioxide nanomaterial;

where, the coupling agent includes at least one of a titanate coupling agent and a silane coupling agent, and the coupling agent contains one terminal amino group; the fatty acid compound is a linear mono-saturated fatty acid with a carbon atom number of 8 to 26.

Specifically, in step 1), 1 part by weight of the anatase type titanium dioxide nanosheet is weighed and mixed with a solution containing 1 to 5 parts by weight of the coupling agent. When the coupling agent is the silane coupling agent, a hydroxyl on the surface of the anatase type titanium dioxide nanosheet undergoes a dehydration condensation reaction with a hydroxyl of a silane group in the coupling agent, forming a silicon oxygen covalent bond to obtain an intermediate with a grafted silane chain and a terminal amino group. When the coupling agent is the titanate coupling agent, a titanate group in the coupling agent reacts with the hydroxyl, forming a titanium oxygen covalent bond to obtain an intermediate with a grafted titanate chain and the terminal amino group.

The coupling agent of the present disclosure contains one terminal amino group. For example, the silane coupling agent includes but is not limited to any one or more of N-(2-aminoethyl)-3-aminopropyl trimethoxysilane, N-aminoethyl-3-aminopropyl triethoxysilane, Y-aminopropylmethyl diethoxysilane, and 3-aminopropylmethyl dimethoxysilane; the titanate coupling agent includes but is not limited to at least one of isopropoxy tri (ethylenediamino-N-ethoxy) titanate and neoalkoxy tri (p-aminophenoxy) titanate.

Where, in order to make the silane coupling agent and the anatase type titanium dioxide nanosheet fully react, stirring may be used to fully mix the two. Rotation speed of stirring is not limited by the present disclosure, and its appropriate range may be selected according to the actual situation, such as 50 to 1000 rpm.

Specific time of mixing is also not limited by the present disclosure, and may be selected according to the actual situation, such as 1 to 4 h.

In step 2), the terminal amino group of the intermediate mentioned above is amidated with 1 to 15 parts by weight of the fatty acid compound under the action of 0.01 to 1 parts by weight of the catalyst, and then washed with a cleaning solvent and dried to obtain the modified titanium dioxide nanomaterial with a long carbon chain.

In detail, the fatty acid compound of the present disclosure is a linear mono-saturated fatty acid with a carbon atom number of 8 to 26. For example, the fatty acid compound includes but is not limited to any one or more of lanolin acid, stearic acid, palmitic acid, arachidic acid, and cerinic acid.

Specific type of the catalyst is not limited by the present disclosure, as long as they can catalyze acylation reactions. For example, the catalyst includes but is not limited to any one or more of carbonylimidazole, 3-ethylcarbodiimide, and diisopropylcarbodiimide.

Common cleaning solvents may be used for cleaning in the present disclosure, such as ethanol, deionized water, etc. Similarly, common drying methods such as centrifugal drying may also be used for drying. The number of times of the washing, and the time and temperature of the drying, are not limited by the present disclosure, and an appropriate range may be selected according to the actual situation.

In order to make the intermediate and the fatty acid compound fully react with each other and ensure the modification effect, longer reaction time, such as 12 to 24 h, may be chosen.

The preparation method of the modified titanium dioxide nanomaterial of the present disclosure uses the anatase type titanium dioxide nanosheet, the coupling agent with the terminal amino group, and the fatty acid compound with a certain amount of carbon atoms as raw materials; and through a series of chemical reactions, the modified titanium dioxide nanomaterial is obtained. The modified titanium dioxide nanomaterial obtained by the preparation method of the present disclosure has higher dispersion stability and lower oil/water interfacial tension, which can significantly enhance the oil recovery. The inventor's analysis believes that on the one hand, the anatase type titanium dioxide nanosheet may first react with the coupling agent, allowing the anatase type titanium dioxide nanosheet to be grafted onto a silane chain or a titanate chain with a terminal amino group by covalent bonds to obtain the intermediate; subsequently, under the action of the catalyst, the terminal amino group in the intermediate is amidated with the hydroxyl in the fatty acid compound to obtain the modified titanium dioxide nanomaterial with a long carbon chain at its end. The anatase type titanium dioxide nanosheet in the modified titanium dioxide nanomaterial is hydrophilic and oleophobic, and interacts with water molecules through hydrogen bonding or other electrostatic interactions; while the long carbon chain at the end is oleophilic and hydrophobic, and interacts with the oil phase. Under the collaborative action of them, the interfacial tension between oil and water is reduced, thereby enhancing the oil recovery.

Further, in a specific embodiment of the present disclosure, the number of carbon atoms is 12 to 22.

In detail, the number of carbon atoms in the fatty acid compound is 12 to 22. For example, the number of carbon atoms includes but is not limited to 12, 13, 14, 15, 16, 17, 18, 19, 20, 21, 22, or a range consisting of any two thereof.

When the number of carbon atoms in the fatty acid compound falls within the above range, the hydrophilicity of the anatase type titanium dioxide nanosheet matrix and the lipophilicity of the long carbon chain in the modified titanium dioxide nanomaterial can achieve a good balance, so as to make the nanofluid containing the modified titanium dioxide nanomaterial have relatively low oil/water interfacial tension, and enhance the oil recovery.

Further, in an embodiment of the present disclosure, the anatase type titanium dioxide nanosheet has a specific surface area of 40 to 100 $m^2/g$, a thickness of 2 to 6 nm, and a side length of 10 to 40 nm.

The specific surface area of the anatase type titanium dioxide nanosheet in the present disclosure refers to the specific surface area range of all anatase type titanium dioxide nanosheets used for modification, which is detected by a specific surface area analysis tester.

The thickness and side length of the anatase type titanium dioxide nanosheet in the present disclosure refer to the numerical range measured by all anatase type titanium dioxide nanosheets used for modification, which may be obtained through common measurement methods in the field, and the specific measurement method is not limited by the present disclosure.

Specifically, the specific surface area of the anatase type titanium dioxide nanosheet is 40 to 100 $m^2/g$. For example, the specific surface area includes but is not limited to 40 $m^2/g$, 50 $m^2/g$, 60 $m^2/g$, 70 $m^2/g$, 80 $m^2/g$, 90 $m^2/g$, 100 $m^2/g$ or a range consisting of any two thereof.

The thickness of the anatase type titanium dioxide nanosheet is 2 to 6 nm. For example, the thickness includes but is not limited to 2 nm, 3 nm, 4 nm, 5 nm, 6 nm or a range consisting of any two thereof.

The side length of the anatase type titanium dioxide nanosheet is 10 nm to 40 nm. For example, the side length includes but is not limited to 10 nm, 15 nm, 20 nm, 25 nm, 30 nm, 35 nm, 40 nm, or a range consisting of any two thereof.

The controlling method of the specific surface area, thickness, and side length of the anatase type titanium dioxide nanosheet is not limited by the present disclosure and they may be controlled by the common methods in the art. For example, the size may be controlled by controlling the synthesis conditions of the anatase type titanium dioxide nanosheet, and the specific synthesis conditions include temperature, amount of hydrofluoric acid, reaction time, stirring speed, etc.

When the specific surface area, thickness, and side length of the anatase type titanium dioxide nanosheet are within the above range, the specific surface area, thickness, and side length of the modified titanium dioxide nanomaterial obtained through a series of reactions may also be effectively controlled within the above range. When the specific surface area of the modified titanium dioxide nanomaterial is within the above range, the effective contact area between the modified titanium dioxide nanomaterial and the oil/water interface in the reservoir is larger, the interfacial effect is greatly enhanced, and the dispersion stability is improved; when the size of modified titanium dioxide nanomaterial is within the above range, the modified titanium dioxide nanomaterial can smoothly pass through porous media with low permeability with low adsorption loss, having good displacement effect, and enhancing the oil recovery.

Further, in a specific embodiment of the present disclosure, a preparation process of the anatase type titanium dioxide nanosheet includes the following steps:

adding 1 part by weight of titanium source into a solution containing 0.1 to 1 parts by weight of hydrofluoric acid; stirring and mixing with a reaction temperature controlled to be 150 to 250° C. and a reaction time to be 2 to 24 h; after cooling to room temperature, washing and drying the reaction product to obtain an anatase type titanium dioxide nanosheet.

Specifically, 1 part by weight of titanium source and a solution containing 0.1 to 1 parts by weight of hydrofluoric acid are stirred at normal temperature (15 to 30° C.) to mix thoroughly. The temperature is then raised to 150 to 250° C., and the titanium source reacts with hydrofluoric acid for 2 to 24 h. After the reaction system is cooled to room temperature, the reaction product is washed and dried to obtain the anatase type titanium dioxide nanosheet.

Specific type of titanium source is not limited by the present disclosure, and an appropriate titanium source may be selected according to the actual situation. For example, the titanium source includes but is not limited to one or more of titanium tetrachloride, titanium isopropanol, titanium tetrafluoride, and tetrabutyl titanate.

The solution of hydrofluoric acid of the present disclosure refers to the solution obtained by dissolving hydrofluoric acid in an organic solvent, where the organic solvent may be selected from the commonly used organic solvent in the art, such as ethanol.

Where, the stirring speed and time of a solution of titanium source and hydrofluoric acid at normal temperature are not limited by the present disclosure, as long as the thorough mixing of titanium source and hydrofluoric acid can be achieved. For example, stirring is performed at a speed of 50 to 800 rpm for 5 to 30 minutes. The stirring process can effectively prevent agglomeration of titanium source in the reaction system, thereby preparing for sufficient reaction between titanium source and hydrofluoric acid.

Specific operation process, reagent type and other parameters of washing and drying are not limited by the present disclosure, as long as a dry anatase type titanium dioxide nanosheet can be obtained.

The anatase type titanium dioxide nanosheet prepared by the above preparation method has intact shape, small size, and large specific surface area, providing a raw material with excellent performance for the preparation of modified titanium dioxide nanomaterial. Moreover, the preparation method has advantages of low preparation cost, simple and controllable preparation condition, and high recyclability.

Through a large number of creative experiments, the inventor found that the part by weight of raw material and the reaction conditions during the preparation process of the anatase type titanium dioxide nanosheet have a significant impact on the properties of the finally obtained modified anatase type titanium dioxide nanomaterial.

Further, in a specific embodiment of the present disclosure, during the preparation of the anatase type titanium dioxide nanosheet, the part by weight of hydrofluoric acid is 0.1 to 0.5, the reaction temperature is 180 to 230° C., and the reaction time is 12 to 24 h.

In detail, in the preparation process of the anatase type titanium dioxide nanosheet, when the part by weight of the titanium source is 1, the part by weight of hydrofluoric acid is 0.1 to 0.5. For example, the part by weight of hydrofluoric acid includes but is not limited to 0.1, 0.2, 0.3, 0.4, 0.5 or a range consisting of any two thereof.

The reaction temperature in the reaction process between titanium source and hydrofluoric acid is 180 to 230° C. For example, the reaction temperature includes but is not limited to 180° C., 190° C., 200° C., 210° C., 220° C., 230° C., or a range consisting of any two thereof.

The reaction time in the reaction process between titanium source and hydrofluoric acid is 12 to 24 h. For example, the reaction time is 12 h, 13 h, 14 h, 15 h, 16 h, 17 h, 18 h, 19 h, 20 h, 21 h, 22 h, 23 h, 24 h or a range consisting of any two thereof.

When the part by weight of raw materials, reaction temperature and reaction time are controlled in the reaction process, the reaction efficiency can be improved and the time cost of the preparation process can be reduced, and the prepared anatase type titanium dioxide nanosheet also has higher specific surface area, suitable thickness and edge length as well.

Analysis shows that appropriate reaction conditions are beneficial for the growth of nanosheet. If the time is short and the temperature is low, the reaction would be insufficient, resulting in an irregular shape, a large size, and a low crystallinity of the generated nanosheet. Appropriate amount of raw materials may control the size of nanosheet. When the amount of hydrofluoric acid used is too small, the formed nanosheet has a larger size. When the amount of hydrofluoric acid used is too large, the generated titanium dioxide nanosheet would be dissolved in hydrofluoric acid under high temperature condition.

Another aspect of the present disclosure provides a modified titanium dioxide nanomaterial which is prepared by the above-mentioned preparation method.

The modified titanium dioxide nanomaterial takes the anatase type titanium dioxide nanosheet as a matrix, and long carbon chain is grafted onto the surface of the anatase type titanium dioxide nanosheet by the coupling agent. When applied to nanofluids, the modified titanium dioxide nanomaterial can significantly reduce the interfacial tension between oil and water, enhance stability, and thus enhance oil recovery.

The reason is that the anatase type titanium dioxide nanosheet matrix in the modified titanium dioxide nanomaterial is hydrophilic and oleophobic while the long carbon chain is oleophilic and hydrophobic, and the synergistic effect between the two makes the whole modified titanium dioxide nanomaterial have a lower overall oil/water interfacial tension, enhancing oil recovery.

Another aspect of the present disclosure provides a nanofluid, which includes a modified titanium dioxide nanomaterial described above and a solvent including one of aqueous salt solution and deionized water.

Specifically, the modified titanium dioxide nanomaterial is mixed with the solvent to obtain the nanofluid. Where, the solution may be selected from aqueous salt solution or deionized water.

Specific type of salt compound in aqueous salt solution is not limited by the present disclosure. At least one of the common salt compounds in the art, such as sodium sulfate, sodium bicarbonate, sodium chloride, calcium chloride, and magnesium chloride, may be selected.

The aqueous salt solution in the present disclosure may be prepared by mixing a commercially available salt compound with water, or may directly use oilfield produced water to further reduce production costs.

As the nanofluid provided by the present disclosure includes the above-mentioned modified titanium dioxide nanomaterial, the nanofluid has lower oil/water interfacial tension and higher dispersion stability, which can significantly enhance oil recovery when applied to oil recovery.

Further, in an embodiment of the present disclosure, the concentration of modified titanium dioxide nanomaterial in the nanofluid described above is 30 to 1000 ppm.

The concentration of modified titanium dioxide nanomaterial in the nanofluid may be controlled by the mass volume ratio of modified titanium dioxide nanomaterial to solvent. The concentration of modified titanium dioxide nanomaterial is 30 to 1000 ppm, for example, the concentration includes but is not limited to 30 ppm, 50 ppm, 100 ppm, 200 ppm, 300 ppm, 400 ppm, 500 ppm, 600 ppm, 700 ppm, 800 ppm, 900 ppm, 1000 ppm, or a range consisting of any two thereof.

When the concentration of modified titanium dioxide nanomaterial is within the above range, it can effectively control the oil/water interfacial tension of the nanofluid. Specifically, when the concentration ranges from 30 to 1000 ppm, the oil/water interfacial tension of the nanofluid may be lower than 1 mN/m. When the concentration is 100 ppm, the oil/water interfacial tension may be as low as 0.01 mN/m. When the concentration ranges from 30 to 100 ppm, with the increase of concentration, the oil/water interfacial tension of the nanofluid gradually decreases. When the concentration ranges from 100 to 1000 ppm, with the increase of concentration, the oil/water interfacial tension of the nanofluid gradually increases. The above range of oil/water interfacial tension can achieve effective contact between the nanofluid and the crude oil in the reservoir, and also can ensure the good dispersion of the modified titanium dioxide nanomaterial in the nanofluid, further enhancing the oil recovery.

Further, in a specific embodiment of the present disclosure, a concentration of aqueous salt solution in the nanofluid described above ranges from 100 to 300000 mg/L.

The concentration of aqueous salt solution in the present disclosure may be controlled by adjusting the mass ratio of a salt compound to water; or the above-mentioned concentration range of aqueous salt solution may be prepared according to different types of salt compounds.

For example, aqueous salt solutions are prepared according to Table 1.

TABLE 1

| Salt compound | Concentration |
|---|---|
| $Na_2SO_4$ | 50 mg/L |
| $NaHCO_3$ | 90 mg/L |
| NaCl | 32000 mg/L |
| $CaCl_2$ | 6500 mg/L |
| $MgCl_2$ | 550 mg/L |

When the concentration of aqueous salt solution is within the above range, the adsorption of ions present in the aqueous salt solution at the oil/water interface in the reservoir can be avoided as much as possible, and the oil/water interface tension of the nanofluid can be ensured, so as to enable better synergistic effect between the anatase type titanium dioxide matrix and hydrophobic alkyl amine chain, thereby enhancing oil recovery.

Another aspect of the present disclosure provides a method for oil recovery, which adopts the nanofluid described above to recover oil reservoirs.

Specifically, the above-mentioned nanofluid is continuously or alternately injected into the oil reservoir to reduce the interfacial tension between the oil reservoir and water, improve oil displacement efficiency, and further enhance oil recovery, achieving reservoir exploitation.

Hereinafter, a detailed explanation is given to the nanofluid including the modified titanium dioxide nanomaterial of the present disclosure through specific examples.

Example 1

In the present example, an anatase type titanium dioxide nanosheet, a modified titanium dioxide nanomaterial, and a nanofluid were prepared according to the following steps.

1. Preparation of anatase type titanium dioxide nanosheet: 1 part by weight of isopropanol titanium was added to an ethanol solution containing 0.3 parts by weight of hydrofluoric acid to obtain a reaction mixture. The reaction mixture was stirred at 500 rpm for 5 minutes at room temperature, and then was transferred to a reaction kettle. The reaction mixture reacted at 200° C. for 24 hours to give a reaction product, and the reaction product was washed with ethanol and deionized water in turn, and then dried centrifugally to obtain the anatase type titanium dioxide nanosheet. The obtained anatase type titanium dioxide nanosheet had a specific surface area of 40 to 100 m$^2$/g, a thickness of 2 to 6 nm and a side length of 10 to 40 nm.

2. Preparation of modified titanium dioxide nanomaterial: 1 part by weight of the anatase type titanium dioxide nanosheet obtained in step 1 was added to an ethanol solution containing 5 parts by weight of N-(2-aminoethyl)-3-aminopropyltrimethoxysilane, and underwent a reaction at 300 rpm and room temperature for 6 hours to obtain an intermediate. Then, 1 part by weight of stearic acid and 0.01 parts by weight of carbonylimidazole were added to the intermediate. The mixture reacted at room temperature for 12 hours to give a reaction product, and the reaction product was washed with ethanol and deionized water in turn and then dried centrifugally to obtain the modified titanium dioxide nanomaterial.

3. Preparation of nanofluid: the modified titanium dioxide nanomaterial prepared above was mixed with deionized water to keep a concentration of the modified titanium dioxide nanomaterial to be 100 ppm, and was subjected to ultrasonication for 15 minutes to obtain the nanofluid.

The anatase type titanium dioxide nanosheet and the modified titanium dioxide nanomaterial above were identified by conventional methods in the art.

FIG. 1 is an SEM (scanning electron microscope) image of the modified titanium dioxide nanomaterial prepared in Example 1. According to FIG. 1, it can be seen that the modified titanium dioxide nanomaterial prepared in Example 1 has a specific surface area of 40 to 100 m$^2$/g, a thickness of 2 to 6 nm and a side length of 10 to 40 nm.

Figure 2:
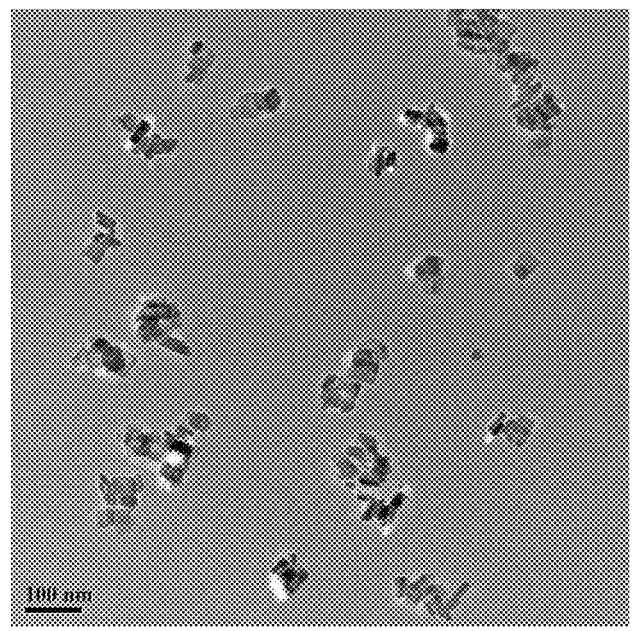
FIG. 2 is a high-resolution TEM (transmission electron microscope) image of a modified titanium dioxide nanomaterial prepared in Example 1 of the present disclosure.

FIG. 2 is a high-resolution TEM (transmission electron microscope) image of the modified titanium dioxide nanomaterial prepared in Example 1. According to FIG. 2, it can be seen that the modified titanium dioxide nanomaterial prepared in Example 1 has a small size, good dispersion stability, uniform size, and little agglomeration.

Figure 3:
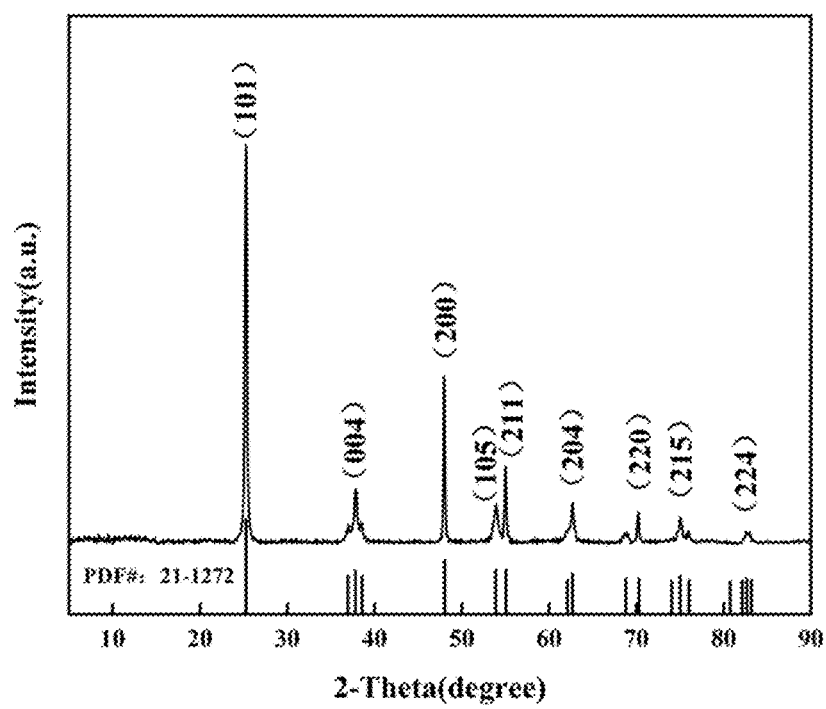
FIG. 3 is an XRD pattern of a modified titanium dioxide nanomaterial prepared in Example 1 of the present disclosure.

FIG. 3 is an XRD pattern of the modified titanium dioxide nanomaterial prepared in Example 1. According to FIG. 3, it can be seen that the modified titanium dioxide nanomaterial prepared in Example 1 is a standard anatase titanium dioxide (JCPD #21-1272).

Figure 4:
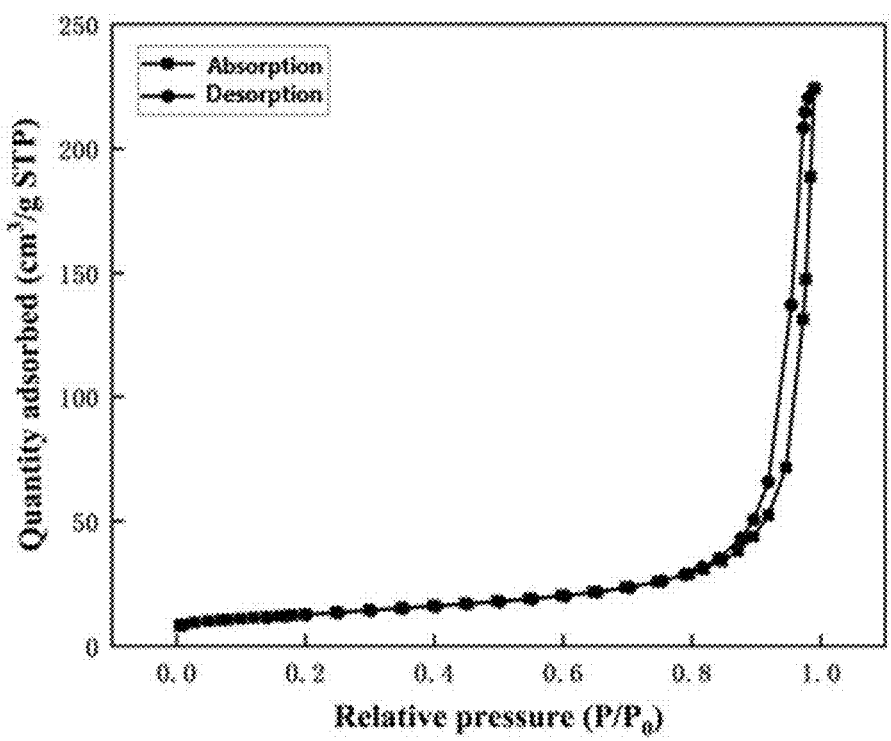
FIG. 4 is a nitrogen adsorption curve of a modified titanium dioxide nanomaterial prepared in Example 1 of the present disclosure.

FIG. 4 is a nitrogen adsorption curve of the modified titanium dioxide nanomaterial prepared in Example 1. According to FIG. 4, it can be seen that the modified titanium dioxide nanomaterial prepared in Example 1 belongs to the H3 type hysteresis loop adsorption isotherm type in the IV type adsorption isotherm, indicating that the micro pore structure of the surface of the modified titanium dioxide nanomaterial is irregular, and the calculated specific surface area is 44.69 m$^2$/g. The relative large specific surface area provides more opportunities for the modified titanium dioxide nanomaterial to interact with surrounding media in the porous media of the oil reservoir.

Figure 5:
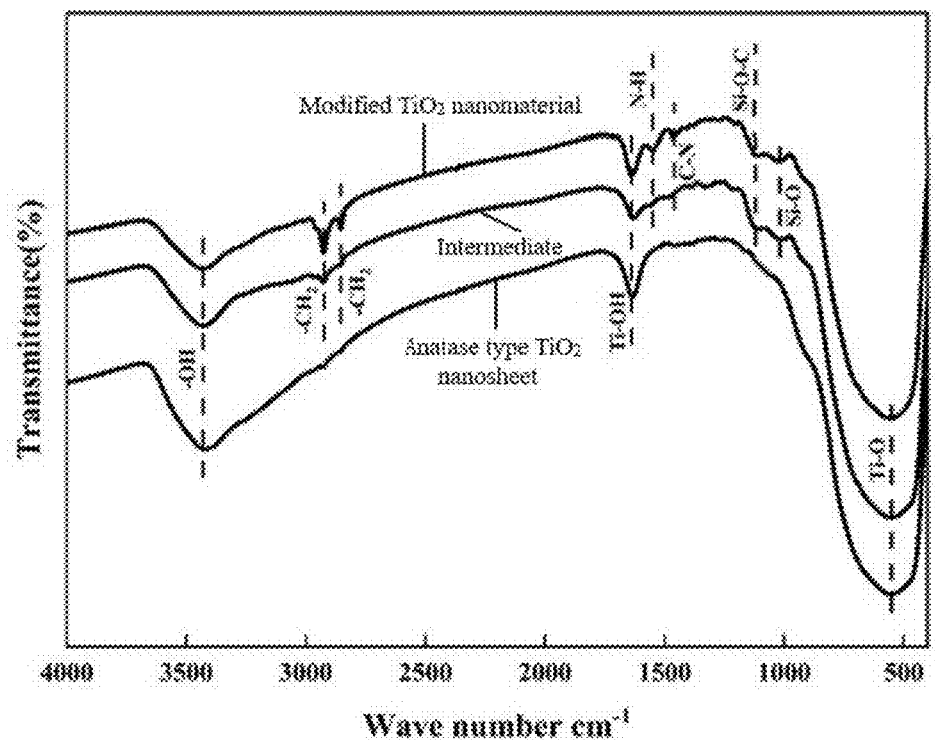
FIG. 5 is an FTIR image of an anatase type titanium dioxide nanosheet, an intermediate, and a modified titanium dioxide nanomaterial prepared in Example 1 of the present disclosure.

FIG. 5 is an FTIR image of the anatase type titanium dioxide nanosheet, the intermediate, and the modified titanium dioxide nanomaterial prepared in Example 1. As shown in FIG. 5, the peak at 3431 cm$^{-1}$ is due to the stretching vibration of —OH caused by intermolecular and intramolecular hydrogen bonds, the peaks at 2854 cm$^{-1}$ and 2924 cm$^{-1}$ are due to the symmetric vibration and asymmetric vibration of C—H, the peak at 1550 cm$^{-1}$ is due to the stretching vibration of N—H in the amide group, the peak at 1462 cm$^{-1}$ is due to the stretching vibration of C—N in the amide group, the peak at 1635 cm$^{-1}$ is due to the stretching vibration of —OH adsorbed on the surface of titanium dioxide, and the peaks at 1018 cm$^{-1}$ and 1120 cm$^{-1}$ are due to the stretching vibration of Si—O and the stretching vibration of Si—O—C in N-(2-aminoethyl)-3-aminopropyltrimethoxysilane, and the broad absorption peak at 400 to 900 cm$^{-1}$ is the Ti—O vibration peak.

Figure 6:
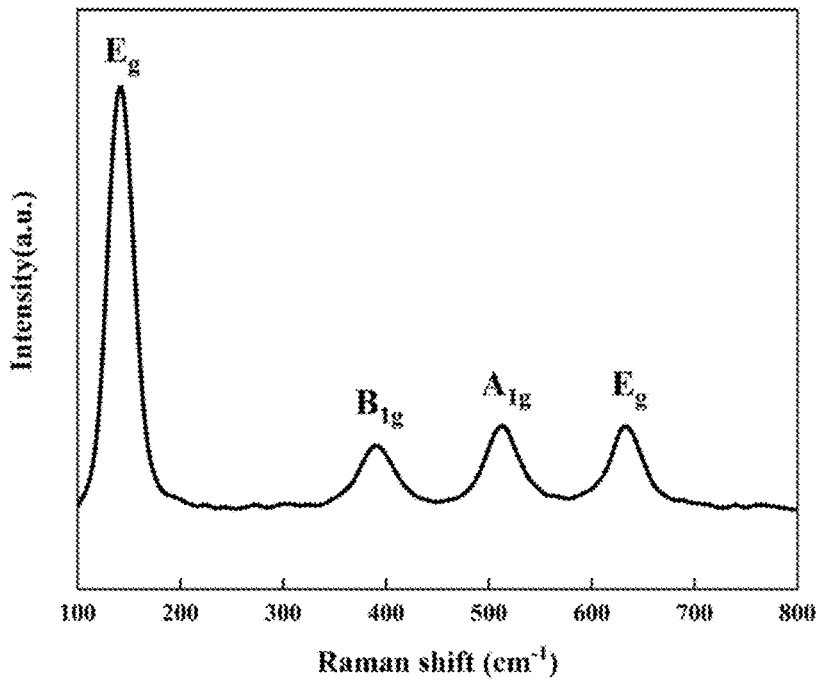
FIG. 6 is a Raman spectrum of a modified titanium dioxide nanomaterial prepared in Example 1 of the present disclosure.

FIG. 6 is a Raman spectrum of the modified titanium dioxide nanomaterial prepared in Example 1. According to FIG. 6, it can be seen that the modified titanium dioxide nanomaterial prepared in the present example exhibits four peaks at 142 cm$^{-1}$, 390 cm$^{-1}$, 513 cm$^{-1}$, and 632 cm$^{-1}$, corresponding to the four peaks of Eg, B1g, A1g, and Eg, respectively. The characteristic peaks of the Raman spectrum prove that the modified titanium dioxide nanomaterial prepared in Example 1 is the anatase type titanium dioxide, which is consistent with the XRD characterization results.

Example 2

In the present example, an anatase type titanium dioxide nanosheet, a modified titanium dioxide nanomaterial, and a nanofluid were prepared according to the following steps.

1. Preparation of anatase type titanium dioxide nanosheet: 1 part by weight of titanium tetrafluoride was added to an ethanol solution containing 0.5 parts by weight of hydrofluoric acid to obtain a reaction mixture. The reaction mixture was stirred at 800 rpm for 30 min at room temperature, then transferred to a reaction kettle. The reaction mixture reacted at 200° C. for 24 hours to give a reaction product, and the reaction product was washed with ethanol and deionized water in turn and then dried centrifugally to obtain the anatase type titanium dioxide nanosheet. The obtained anatase type titanium dioxide nanosheet had a specific surface area of 40 to 100 m$^2$/g, a thickness of 2 to 6 nm and a side length of 10 to 40 nm.

2. Preparation of modified titanium dioxide nanomaterial: 1 part by weight of the anatase type titanium dioxide nanosheet obtained in step 1 was added to an ethanol solution containing 1 part by weight of N-aminoethyl-3-aminopropyltriethoxysilane, and underwent a reaction at 500 rpm for 8 hours at normal temperature to obtain an intermediate. Then, 1 part by weight of palmitic acid and 0.01 parts by weight of 3-ethylcarbodiimide were added. The mixture reacted at room temperature for 24 hours to give a reaction product, and the reaction product was washed with ethanol and deionized water. After centrifugal drying of the washed reaction product, the obtained precipitate was collected to obtain the modified titanium dioxide nanomaterial.

3. Preparation of nanofluid: the modified titanium dioxide nanomaterial prepared above was mixed with deionized water to keep a concentration of the modified titanium dioxide nanomaterial to be 100 ppm, and was subjected to ultrasonication for 30 minutes to obtain the nanofluid.

Example 3

In the present example, an anatase type titanium dioxide nanosheet, a modified titanium dioxide nanomaterial, and a nanofluid were prepared according to the following steps.

1. Preparation of anatase type titanium dioxide nanosheet: 1 part by weight of titanium tetrachloride was added to an ethanol solution containing 0.3 parts by weight of hydrofluoric acid to obtain a reaction mixture. The reaction mixture was stirred at 500 rpm for 30 minutes at room temperature, and then was transferred to a reaction kettle. The reaction mixture reacted at 200° C. for 16 hours to give a reaction product, and the reaction product was washed with ethanol and deionized water in turn and then dried centrifugally to obtain the anatase type titanium dioxide nanosheet. The obtained anatase type titanium dioxide nanosheet had a specific surface area of 40 to 100 m$^2$/g, a thickness of 2 to 6 nm and a side length of 10 to 40 nm.

2. Preparation of modified titanium dioxide nanomaterial: 1 part by weight of the anatase type titanium dioxide nanosheet obtained in step 1 was added to an ethanol solution containing 2 parts by weight of v-aminopropylmethyl diethoxysilane, and underwent a reaction at 800 rpm for 10 hours at normal temperature to obtain an intermediate. Then, 15 parts by weight of stearic acid and 1 part by weight of diisopropylcarbodiimide were added to the intermediate. The mixture reacted at room temperature for 24 hours to give a reaction product, and the reaction product was washed with ethanol and deionized water and then dried centrifugally to obtain the modified titanium dioxide nanomaterial.

3. Preparation of nanofluid: the modified titanium dioxide nanomaterial prepared above was mixed with aqueous salt solution at a concentration of 39190 mg/L to keep a concentration of the modified titanium dioxide nanomaterial to be 100 ppm, and was subjected to ultrasonication for 15 minutes to obtain the nanofluid.

Example 4

In the present example, an anatase type titanium dioxide nanosheet, a modified titanium dioxide nanomaterial, and a nanofluid were prepared according to the following steps.

1. Preparation of anatase type titanium dioxide nanosheet: 1 part by weight of tetrabutyl titanate was added to an ethanol solution containing 0.5 parts by weight of hydrofluoric acid to obtain a reaction mixture. The reaction mixture was stirred at 600 rpm for 30 minutes at room temperature, and then was transferred to a reaction kettle. The reaction mixture reacted at 180° C. for 16 hours to give a reaction product, and the reaction product was washed with ethanol and deionized water and then dried centrifugally to obtain the anatase type titanium dioxide nanosheet. The obtained anatase type titanium dioxide nanosheet had a specific surface area of 40 to 100 m$^2$/g, a thickness of 2 to 6 nm and a side length of 10 to 40 nm.

2. Preparation of modified titanium dioxide nanomaterial: 1 part by weight of the anatase type titanium dioxide nanosheet obtained in step 1 was added to an ethanol solution containing 2 parts by weight of isopropoxy tri (ethylenediamino-N-ethoxy) titanate, and reacted at 500 rpm for 8 hours at normal temperature to obtain an intermediate. Then, 15 parts by weight of arachidic acid and 0.5 parts by weight of diisopropylcarbodiimide were added to the intermediate. The mixture reacted at room temperature for 24 hours to give a reaction product, and the reaction product was washed with ethanol and deionized water and then dried centrifugally to obtain the modified titanium dioxide nanomaterial.

3. Preparation of nanofluid: the modified titanium dioxide nanomaterial prepared above was mixed with deionized water to keep a concentration of the modified titanium dioxide nanomaterial to be 30 ppm, and was subjected to ultrasonication for 30 minutes to obtain the nanofluid.

Example 5

In the present example, an anatase type titanium dioxide nanosheet, a modified titanium dioxide nanomaterial, and a nanofluid were prepared according to the following steps.

1. Preparation of anatase type titanium dioxide nanosheet: 1 part by weight of isopropanol titanium was added to an ethanol solution containing 0.3 parts by weight of hydrofluoric acid to obtain a reaction mixture. The reaction mixture was stirred at 800 rpm for 30 minutes at room temperature, and then was transferred to a reaction kettle. The reaction mixture reacted at 150° C. for 12 hours to give a reaction product, and the reaction product was washed with ethanol and deionized water and then dried centrifugally to obtain the anatase type titanium dioxide nanosheet. The obtained anatase type titanium dioxide nanosheet had a specific surface area of 40 to 100 $m^2/g$, a thickness of 2 to 6 nm and a side length of 10 to 40 nm.

2. Preparation of modified titanium dioxide nanomaterial: 1 part by weight of the anatase type titanium dioxide nanosheet obtained in step 1 was added to an ethanol solution containing 2 parts by weight of 3-aminopropylmethyldimethoxysilane, and underwent a reaction at 400 rpm for 8 hours at normal temperature to obtain an intermediate. Then, 15 parts by weight of cerinic acid and 0.3 parts by weight of carbonylimidazole were added to the intermediate. The mixture reacted at room temperature for 24 hours to give a reaction product, and the reaction product was washed with ethanol and deionized water and then dried centrifugally to obtain the modified titanium dioxide nanomaterial.

3. Preparation of nanofluid: the modified titanium dioxide nanomaterial prepared above was mixed with deionized water to keep a concentration of the modified titanium dioxide nanomaterial to be 100 ppm, and was subjected to ultrasonication for 30 to obtain the nanofluid of the present example.

Example 6

The preparation process of an anatase type titanium dioxide nanosheet, a modified titanium dioxide nanomaterial, and a nanofluid in the present example is basically the same as in Example 2, except that:
2. During the preparation process of the modified titanium dioxide nanomaterial, palmitic acid is replaced with lanolin acid.

Example 7

The preparation process of an anatase type titanium dioxide nanosheet, a modified titanium dioxide nanomaterial, and a nanofluid in the present example is basically the same as in Example 2, except that:
1. During the preparation process of the anatase type titanium dioxide nanosheet, the part by weight of hydrofluoric acid is 0.6, the reaction temperature is 160° C., and the reaction time is 2 h, so that the anatase type titanium dioxide nanosheet is obtained with a specific surface area of 10 to 30 $m^2/g$, a thickness of 10 to 20 nm, and a side length of 100 to 200 nm.

Example 8

The preparation process of an anatase type titanium dioxide nanosheet, a modified titanium dioxide nanomaterial, and a nanofluid in the present example is basically the same as in Example 2, except that:
3. During the preparation process of the nanofluid, the concentration of the modified titanium dioxide nanomaterial is 10 ppm.

Example 9

The preparation process of an anatase type titanium dioxide nanosheet, a modified titanium dioxide nanomaterial, and a nanofluid in the present example is basically the same as in Example 2, except that:
3. During the preparation process of the nanofluid, deionized water is replaced by aqueous salt solution with a concentration of 400000 mg/L.

Comparative Example 1

The preparation process of an anatase type titanium dioxide nanosheet and a nanofluid in the present comparative example is basically the same as in Example 2, except that:
3. During the preparation process of the nanofluid, the modified titanium dioxide nanomaterial is replaced by the anatase titanium dioxide nanosheet.

Comparative Example 2

The preparation process of an anatase type titanium dioxide nanosheet, a modified titanium dioxide nanomaterial, and a nanofluid in the present comparative example is basically the same as in Example 2, except that:
2. During the preparation process of the modified titanium dioxide nanomaterial, the palmitic acid is replaced by n-hexanoic acid.

Comparative Example 3

The preparation process of an anatase type titanium dioxide nanosheet, a modified titanium dioxide nanomaterial, and a nanofluid in the present comparative example is basically the same as in Example 2, except that:
2. During the preparation process of the modified titanium dioxide nanomaterial, the anatase type titanium dioxide nanosheet, N-aminoethyl-3-aminopropyltriethoxysilane, palmitic acid, and 3-ethylcarbodiimide are mixed directly.

Comparative Example 4

The preparation process of an anatase type titanium dioxide nanosheet, a modified titanium dioxide nanomaterial, and a nanofluid in the present comparative example is basically the same as in Example 2, except that:
2. During the preparation process of the modified titanium dioxide nanomaterial, 10 parts by weight of palmitic acid are replaced by 20 parts by weight of palmitic acid.

Test Example

Core oil displacement test was conducted on the nanofluids prepared in Examples 1-9 and Comparative examples 1-4. Sandstone core was used as the core and tested in the oil displacement equipment. The physical properties of the core samples are shown in Table 2.

TABLE 2

| Core Number | Diameter (mm) | Height (mm) | Porosity (%) | Permeability (mD) |
|---|---|---|---|---|
| Example 1 | 24.89 | 99.64 | 14.91 | 4.37 |
| Example 2 | 25.39 | 99.87 | 13.27 | 5.49 |
| Example 3 | 25.27 | 100.19 | 14.90 | 6.93 |
| Example 4 | 25.64 | 99.81 | 13.92 | 5.04 |
| Example 5 | 25.26 | 100.09 | 13.03 | 5.32 |
| Example 6 | 24.96 | 100.24 | 13.48 | 4.22 |
| Example 7 | 25.02 | 100.31 | 14.26 | 5.58 |
| Example 8 | 25.31 | 99.91 | 14.49 | 5.91 |
| Example 9 | 25.16 | 99.97 | 15.33 | 6.34 |
| Comparative example 1 | 25.06 | 100.15 | 15.47 | 6.62 |
| Comparative example 2 | 25.01 | 99.98 | 13.52 | 4.55 |
| Comparative example 3 | 24.97 | 100.24 | 15.67 | 6.23 |

TABLE 2-continued

| Core Number | Diameter (mm) | Height (mm) | Porosity (%) | Permeability (mD) |
|---|---|---|---|---|
| Comparative example 4 | 24.92 | 100.21 | 13.08 | 4.39 |

Before starting the core oil displacement test, the core was vacuumed and saturated with water for 24 hours. Then, the oil with a viscosity of 100 cP was pumped into the core to prevent any further water from flowing out. At the point, the core reached oil saturation, and the volume of crude oil pumped in at the time of core saturation was recorded as $V_0$. After oil saturation, water was injected at a rate of 0.3 mL/min until no more oil flowed out, and the volume of crude oil displaced by water at this point was recorded as $V_1$. Then, the nanofluid was used for oil recovery, where the nanofluid was injected into the core at a rate of 0.3 mL/min until no more oil flowed out. The volume of crude oil displaced by the nanofluid was measured as $V_2$. The water flooding oil recovery, nanofluid flooding oil recovery, and total oil recovery may be calculated using equations 1, 2, and 3, respectively:

$$\text{Water flooding oil recovery (\%)} = V_1/V_0 \quad \text{Equation 1}$$

$$\text{Nanofluid flooding oil recovery (\%)} = V_2/V_0 \quad \text{Equation 2}$$

$$\text{Total oil recovery (\%)} = (V_1 + V_2)/V_0 \quad \text{Equation 3}$$

The test results are shown in Table 3.

TABLE 3

| Core Number | Permeability (mD) | Oil/water interfacial tension (mN/m) | Water flooding oil recovery (%) | Nanofluid flooding oil recovery (%) | Total oil recovery (%) |
|---|---|---|---|---|---|
| Example 1 | 4.37 | 0.01 | 40.91 | 26.42 | 67.33 |
| Example 2 | 5.49 | 0.01 | 41.82 | 26.00 | 67.82 |
| Example 3 | 6.93 | 0.01 | 42.29 | 26.24 | 68.53 |
| Example 4 | 5.04 | 0.98 | 41.48 | 20.77 | 62.25 |
| Example 5 | 5.32 | 0.01 | 41.77 | 26.40 | 68.17 |
| Example 6 | 4.22 | 0.95 | 40.27 | 20.19 | 60.46 |
| Example 7 | 5.58 | 0.92 | 41.26 | 20.22 | 61.48 |
| Example 8 | 5.91 | 5.69 | 41.94 | 5.34 | 47.28 |
| Example 9 | 6.34 | 5.33 | 42.76 | 5.09 | 47.85 |
| Comparative example 1 | 6.62 | 10.31 | 42.19 | 2.63 | 44.82 |
| Comparative example 2 | 4.55 | 8.22 | 40.39 | 4.29 | 44.68 |
| Comparative example 3 | 6.23 | 9.36 | 42.83 | 3.07 | 45.9 |
| Comparative example 4 | 4.39 | 10.34 | 40.01 | 2.38 | 42.39 |

Figure 7:
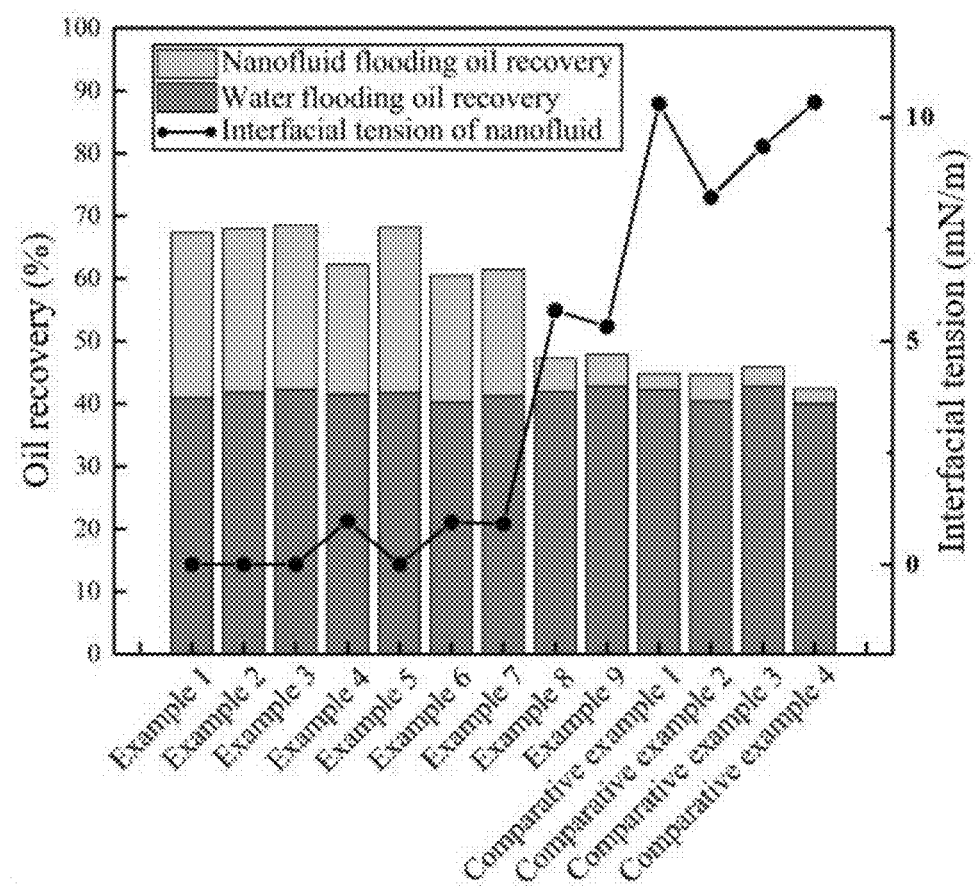
FIG. 7 is an interfacial tension-oil recovery plot of nanofluids prepared in Examples 1-9 and Comparative examples 1-4 of the present disclosure.

FIG. 7 is an interfacial tension-oil recovery plot of nanofluids prepared in Examples 1-9 and Comparative examples 1-4. According to FIG. 7 and Table 3, it can be seen that the nanofluids prepared in Examples 1-9 have higher oil recovery compared to the nanofluids prepared in Comparative examples 1-4. Specifically, when the permeability of sandstone core is not higher than 6.93 mD, the nanofluid flooding oil recovery prepared according to the technical solution of the present disclosure is not less than 5.09%, and the total oil recovery is not less than 47.28%. It can be seen that the nanofluids provided by the present disclosure can effectively enhance the oil recovery of low-permeability reservoirs.

Finally, it should be noted that the above embodiments are only used to illustrate the technical solutions of the present disclosure, but not to limit them; although the present disclosure has been described in detail with reference to the aforementioned embodiments, it should be understood by persons skilled in the art that the technical solutions recorded in the aforementioned embodiments may still be modified or some or all of the technical features thereof may be equivalently replaced; while these modifications or replacements do not depart the essence of the corresponding technical solutions from the scope of the various embodiments of the present disclosure.

What is claimed is:

1. A preparation method of modified titanium dioxide nanomaterial, comprising the following steps: 1) mixing 1 part by weight of an anatase type titanium dioxide nanosheet with a solution containing 1 to 5 parts by weight of a coupling agent for reaction to obtain an intermediate; 2) adding 1 to 15 parts by weight of a fatty acid compound and 0.01 to 1 parts by weight of a catalyst into the intermediate for modification reaction to give a reaction product, and then washing and drying the reaction product to obtain the modified titanium dioxide nanomaterial;
   wherein the coupling agent comprises at least one of a titanate coupling agent and a silane coupling agent, and the coupling agent contains one terminal amino group; and
   wherein the fatty acid compound is a linear mono-saturated fatty acid with a carbon atom number of 8 to 26.

2. The preparation method according to claim 1, wherein the carbon atom number is 12 to 22.

3. The preparation method according to claim 2, wherein the anatase type titanium dioxide nanosheet has a specific surface area of 40 to 100 m2/g, a thickness of 2 to 6 nm and a side length of 10 to 40 nm.

4. The preparation method according to claim 3, wherein a preparation process of the anatase type titanium dioxide nanosheet comprises the following steps:
   adding 1 part by weight of titanium source into a solution containing 0.1 to 1 parts by weight of hydrofluoric acid, stirring and mixing with a reaction temperature controlled to be 150 to 250° C. and a reaction time to be 2 to 24 h, and after cooling to room temperature, washing and drying to obtain the anatase type titanium dioxide nanosheet.

5. The preparation method according to claim 4, wherein in the preparation process of the anatase type titanium dioxide nanosheet, the part by weight of hydrofluoric acid is 0.1 to 0.5, the reaction temperature is 180 to 230° C. and the reaction time is 12 to 24 h.

6. The preparation method according to claim 2, wherein a preparation process of the anatase type titanium dioxide nanosheet comprises the following steps:
   adding 1 part by weight of titanium source into a solution containing 0.1 to 1 parts by weight of hydrofluoric acid, stirring and mixing with a reaction temperature controlled to be 150 to 250° C. and a reaction time to be 2 to 24 h, and after cooling to room temperature, washing and drying to obtain the anatase type titanium dioxide nanosheet.

7. The preparation method according to claim 6, wherein in the preparation process of the anatase type titanium dioxide nanosheet, the part by weight of hydrofluoric acid is 0.1 to 0.5, the reaction temperature is 180 to 230° C. and the reaction time is 12 to 24 h.

8. The preparation method according to claim 1, wherein the anatase type titanium dioxide nanosheet has a specific surface area of 40 to 100 m2/g, a thickness of 2 to 6 nm and a side length of 10 to 40 nm.

9. The preparation method according to claim 8, wherein a preparation process of the anatase type titanium dioxide nanosheet comprises the following steps:
   adding 1 part by weight of titanium source into a solution containing 0.1 to 1 parts by weight of hydrofluoric acid, stirring and mixing with a reaction temperature controlled to be 150 to 250° C. and a reaction time to be 2 to 24 h, and after cooling to room temperature, washing and drying to obtain the anatase type titanium dioxide nanosheet.

10. The preparation method according to claim 9, wherein in the preparation process of the anatase type titanium dioxide nanosheet, the part by weight of hydrofluoric acid is 0.1 to 0.5, the reaction temperature is 180 to 230° C. and the reaction time is 12 to 24 h.

11. The preparation method according to claim 1, wherein a preparation process of the anatase type titanium dioxide nanosheet comprises the following steps:
   adding 1 part by weight of titanium source into a solution containing 0.1 to 1 parts by weight of hydrofluoric acid, stirring and mixing with a reaction temperature controlled to be 150 to 250° C. and a reaction time to be 2 to 24 h, and after cooling to room temperature, washing and drying to obtain the anatase type titanium dioxide nanosheet.

12. The preparation method according to claim 11, wherein in the preparation process of the anatase type titanium dioxide nanosheet, the part by weight of hydrofluoric acid is 0.1 to 0.5, the reaction temperature is 180 to 230° C. and the reaction time is 12 to 24 h.

* * * * *